(12) United States Patent
Dolenti et al.

(10) Patent No.: US 8,424,838 B2
(45) Date of Patent: Apr. 23, 2013

(54) POWER GENERATION FOR VALVE ACTUATORS

(75) Inventors: William T. Dolenti, Lynchburg, VA (US); Daniel J. Morris, Forest, VA (US); Daniel Carlson, Concord, VA (US); Byron A. Fleury, Lynchburg, VA (US); David R. Simons, Ontario (CA)

(73) Assignee: Flowserve Management Company, Irving, TX (US)

( * ) Notice: Subject to any disclaimer, the term of this patent is extended or adjusted under 35 U.S.C. 154(b) by 968 days.

(21) Appl. No.: 12/224,819

(22) PCT Filed: Mar. 7, 2006

(86) PCT No.: PCT/US2006/008047
§ 371 (c)(1),
(2), (4) Date: Dec. 3, 2008

(87) PCT Pub. No.: WO2007/102811
PCT Pub. Date: Sep. 13, 2007

(65) Prior Publication Data
US 2009/0090880 A1    Apr. 9, 2009

(51) Int. Cl.
*F16K 31/02* (2006.01)
(52) U.S. Cl.
USPC .................................. 251/129.03; 137/554

(58) Field of Classification Search ............. 251/129.03, 251/14; 137/554
See application file for complete search history.

(56) References Cited

U.S. PATENT DOCUMENTS

| | | | |
|---|---|---|---|
| 3,732,949 A | 5/1973 | Williams | |
| 3,800,212 A | 3/1974 | Branco et al. | |
| 4,520,516 A * | 6/1985 | Parsons | 251/129.03 |
| 4,524,283 A | 6/1985 | Latvus | |
| 5,427,350 A * | 6/1995 | Rinkewich | 251/129.04 |
| 6,003,837 A | 12/1999 | Raymond et al. | |
| 6,079,442 A * | 6/2000 | Raymond et al. | 251/129.03 |
| 6,930,403 B2 | 8/2005 | Hartman et al. | |
| 7,129,592 B1 * | 10/2006 | Yetter | 290/1 A |

OTHER PUBLICATIONS

International Search Report for PCT/US06/08047, mailed Jun. 21, 2006, 2 pages.

* cited by examiner

*Primary Examiner* — Eric Keasel
(74) *Attorney, Agent, or Firm* — TraskBritt

(57) ABSTRACT

The present invention utilizes operation of a valve actuator to generate electrical power. A portion of the mechanical energy generated by operation of a valve actuator is converted to electrical energy. The mechanical energy may be converted to electrical energy at the same time as the valve actuator is operating or the mechanical energy may be stored for later conversion. A valve actuator may be operated manually, electrically, pneumatically, or hydraulically. Generated electrical energy may also be stored.

13 Claims, 4 Drawing Sheets

POWER GENERATION FOR VALVE ACTUATORS

TECHNICAL FIELD

The present invention relates generally to valve actuators, and more particularly, to power generation for the electronics of a valve actuator.

BACKGROUND

Valve actuators are used to operate valves and are manufactured in numerous shapes, sizes, forms and have a wide variety of utilities. It is common for an operator of a valve actuator to want to know the specific position of a valve. Absolute encoders and incremental encoders have been utilized with valve actuators to determine the position of a valve. The encoders monitor the position of the valve actuator to determine the corresponding position of a valve.

Absolute encoders utilize a unique signature for each position of a valve actuator. Absolute encoders often comprise either a single disc or multiple discs that are rotated as a valve actuator moves to different positions. The single or multiple discs of an absolute encoder have markings, different combinations of which provide a unique signature for each position of a valve actuator. This unique signature can be analyzed at any time to determine the position of the valve actuator.

Incremental encoders, on the other hand, do not have a unique signature for each position of the valve actuator. Instead, incremental encoders monitor changes in the valve actuator relative to an arbitrary starting point, such as the fully closed position of a valve. An incremental encoder, also referred to as a relative encoder, may be a single disc with a series of duplicate markings around the edge of the disc. As the disc is rotated, each time one of the marks passes a point, a change in position is recorded. For example, if a disc had one hundred marks around the edge of the disc, the disc could be rotated multiple times and so that several hundred marks could be counted to indicate changes in position. As long as the marks are recorded in the memory of a computer, then the valve actuator position is known and can be indicated by on-board electronics using status contacts, data bits in user readable data registers, or alpha-numeric displays.

Valve actuators will often have a handwheel, as well, in case the electric motor should either fail or there should be a power failure, so that manual operation of the valve is available. However, a loss of power could result in an erroneous position indication if the handwheel is moved while the power is down and there is no backup or redundant power supply. After the handwheel is moved, the lack of updating can result in a valve actuator indicating one position, when in fact, the valve is in a different position. Actuators using absolute encoders automatically correct the position indication as soon as power is restored. Actuators using incremental encoders must have a backup or redundant power supply to allow them to avoid total loss of position knowledge during a power outage. For this case, when power is lost, the incremental encoder either reverts to its startup position, or its current count is saved to a non-volatile memory location in the on-board electronics. If the handwheel is moved on an incremental encoder system, the electronics will continue to track the position as long as the backup or redundant supply remains alive. If, however, the backup or redundant power supply dies (ex: dead battery), then the incremental encoder based actuator system will lose its proper sense of position if the user moves the handwheel after the backup or redundant power supply dies. Incorrect position information could, in turn, lead to valve damage and incorrect operation of a process controlled by the valve. Either absolute or incremental encoder based systems can maintain proper position information on loss of normal power, as long as there exists a backup or redundant power supply. An absolute encoding system may lose its ability to indicate the proper position during a total power loss, but it will immediately recover on the restoration of power. The incremental system, on the other hand, will need to be recalibrated after a total power loss if the user has also moved the handwheel during the power outage. Users are typically reticent to move a valve that is operating in an active process just to recalibrate the position sensor. To do so, even on a single valve, often requires a complete plant shut down.

The sensing of position information from either an absolute or an incremental encoder requires electrical power. Additionally, when an incremental encoder is used, there is an additional power requirement for storing position information in a memory. Absolute encoders do not require the storage of position information since the information can be readily ascertained from the absolute encoder. Valve actuators that utilize incremental encoders require battery back-up to maintain position information in the event of a power failure. For both absolute and incremental encoders, a back-up power source is necessary to display position information during a primary power failure.

There is a need in the art for electronically displaying updated position information during manual operation of a valve actuator without the need for a back-up battery. A need exists in the art for powering the other electronic components of a valve actuator. Additionally, there is a need in the art for providing electrical power to hydraulic and pneumatic valve actuators without the need for supplying electricity from an external source.

DISCLOSURE OF THE INVENTION

One embodiment of the invention is a method of electrically powering a portion of a valve actuator comprising operating the valve actuator to generate mechanical energy, converting a portion of the mechanical energy into electrical energy, and electrically powering the portion of the valve actuator with the electrical energy.

One embodiment of the invention includes a system for electrically powering accessory electronics of a valve actuator, the system comprising a valve actuator, and an electrical generator adapted to electrically power the accessory electronics of the valve actuator.

One embodiment of the invention includes a power source for a valve actuator comprising a power generation means, an input means adapted to transfer mechanical energy from a drive train of the valve actuator to the power generation means, an engagement means adapted to operatively couple the input means to the power generation means, and a control means adapted to control when the engagement means operatively couples the input means to the power generation means.

The features, advantages, and alternative aspects of the present invention will be apparent to those skilled in the art from a consideration of the following detailed description taken in combination with the accompanying drawings.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

The methods, apparatus, and systems of the present invention may be utilized to provide electrical power to a valve actuator. In one embodiment, the present invention may be used to provide power to an electrically driven valve actuator in the event of a power failure. In other embodiments, the present invention may be used to power electronic equipment on a non-electrically driven valve actuator. Examples of non-electrically driven valve actuators include manually operated valve actuators (such as those driven by handwheels or levers), pneumatic valve actuators, and hydraulic valve actuators. The present invention may be utilized with any type of motive source for valve actuators known in the art. The present invention may also be utilized for electrically driven valve actuators where electricity for operation of the motor is present, but it is desirable to provide a different electric power source for the other electronic components of the actuator. The present invention may be utilized to provide power to any electrical component of a valve actuator, excluding an electric motor prime mover of an electrically driven valve actuator.

Figure 1:
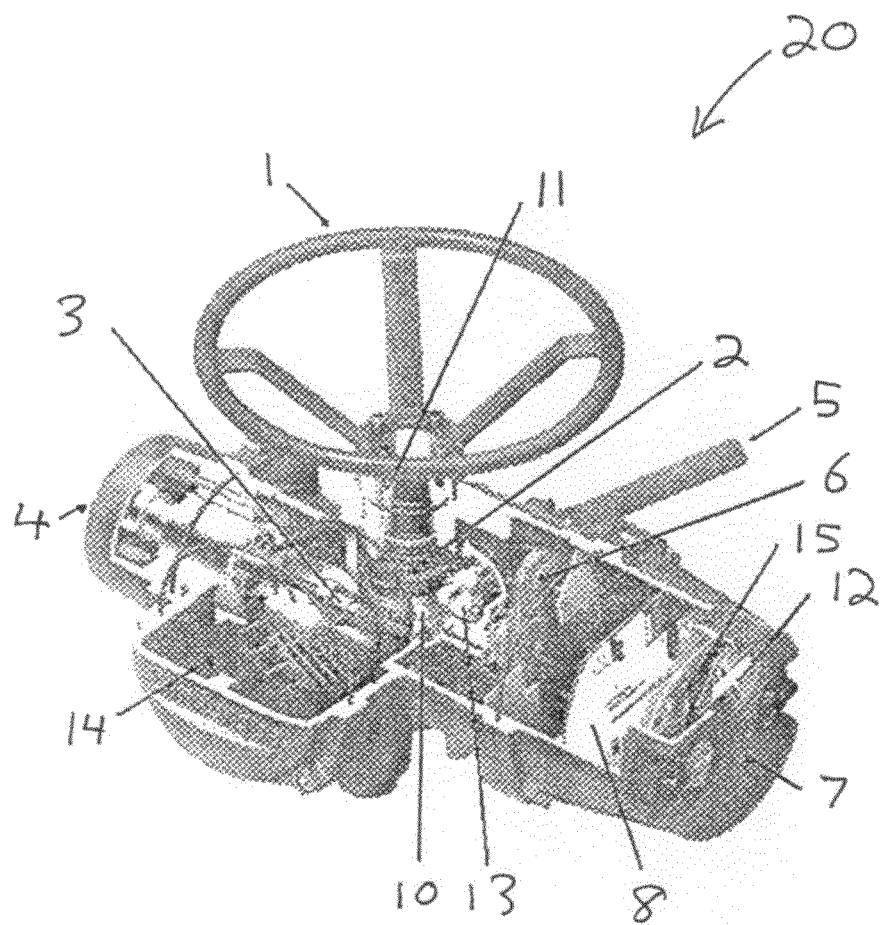
FIG. 1 illustrates an electrically driven valve actuator.

FIG. 1 illustrates an electrically driven valve actuator without the present invention. FIG. 1 illustrates just one version of an electrically driven valve actuator and is not intended to limit the applicability of the invention to any electrically driven or other valve actuator. Valve actuator 20 includes electric motor 4 coupled to worm shaft 3. Handwheel 1 is connected to handwheel adapter 11. Handwheel adapter 11 is connected to drive sleeve 2. Drive sleeve 2 is connected to valve stem nut (not shown). Worm gear 10 mates with worm shaft 3. Worm gear 10 is also coupled to a valve stem nut, which is able to drive the valve stem of a valve. In FIG. 1, valve actuator 20 is not shown attached to a valve. Operation of either electric motor 4 or handwheel 1 raises or lowers a valve stem. The valve stem is able to travel up and down through the center of handwheel 1. The valve stem may also rotate and either operate a nut in the valve which can either open or close the valve or can directly rotate a valve to an open or close position (for example, as in a butterfly, vane, or ball valve).

Valve actuator 20 may include any drive train, hardware, devices, electronics, and/or software utilized in operating a valve. Valve actuator 20 may be designed for any type of valve, including for example, linear, quarter-turn rotary, multi-turn rotary, ball, plug, gate, butterfly, and diaphragm valves. The components of valve actuator 20 may be arranged in any fashion. Handwheel 1 may be oriented to the side of valve actuator 20, as is known in the art.

The drive train encompasses any prime mover, any manual operation mechanism, any disengagement or isolation mechanisms, braking mechanisms, any speed modulation mechanisms, and the mechanisms for attachment to a valve. A drive train may also exclude any of the above elements or also include additional elements. For purposes of illustration only, FIG. 1 shows electric motor 4 as the prime mover and handwheel 1 as the manual operation mechanism. Often, a clutch mechanism will be included so that operation of either electric motor 4 or handwheel 1 does not result in operation of the other. By way of example, a lever 5 and a declutch mechanism 13 can be provided as the disengagement or isolation mechanisms. Numerous clutch and engagement mechanism are known in the art. Declutch mechanism 13 may be designed to engage or disengage any portion of the drive train of valve actuator 20.

In FIG. 1, the braking mechanism and speed modulation mechanisms are both incorporated in worm shaft 3 and worm gear 10. Instead of, or in addition to, worm gear 10 and worm shaft 3, other gear types or no gears may be used in valve actuator 20. Gear types for valve actuators are often selected based upon the amount of speed reduction, if any, between electric motor 4 and valve stem nut. Hereinafter, when referring to the gears of the drive train of a valve actuator, the example of a worm gear and a worm shaft are primarily utilized. However, it should be understood that the discussion may be applied to any gear. If a gear is not present in the valve actuator, then output mechanism of any applicable prime mover may also suffice.

In the example of FIG. 1, the mechanisms for attachment to a valve may be a valve stem nut and associated supporting structures, as are known in the art. However, any mechanism for attachment known in the art may be utilized. The term "valve" as used herein encompasses the most generic uses of the term as used in the art, including the definition of a device that at least partially controls the flow of a liquid, gas, and/or solid. Electric motor 4 may be any electrically driven prime mover capable of operating a valve actuator.

FIG. 1 also illustrates a few of the accessory or auxiliary electrical components of a valve actuator. The terms "accessory" and "auxiliary" as used herein refer to any portion of the components of a valve actuator that utilize electricity, other than the electric motor itself. A particular embodiment of an encoder 6 is illustrated as a multi-wheel absolute encoder. Encoder 6 may also be a single wheel absolute encoder or an incremental encoder. Numerous encoders are known in the art. FIG. 1 also illustrates control module 8 for controlling electric motor 4, and depicts circuit board 15 for receiving inputs from control panel 7 and for sending outputs to indicator 12.

In this particular example, indicator 12 is illustrated as a liquid crystal display (LCD). One or more indicator(s) 12 may be present. A few non-limiting examples of indicators include light-emitting diode lights (LED) and displays, filament lights, and dials. Numerous indicators for valve actuators as known in the art can be used, such as electrically powered pointers.

Any number of accessory electrical components (not shown) may be present in a valve actuator and be supplied power by the present invention. For example, numerous types of sensors for monitoring encoder 6 may also be present and require electrical input. A few non-limiting examples of sensors are optical sensors, magnetic sensors, and Hall effect sensors. Valve actuator 20 may also include any number of sensors for other purposes as well. Processors and associated elements (e.g., diodes, gates, resistors, etc.) may also be present for converting signals from the sensors into valve position data. Memory may also be present for retaining position data. Of course, processors, memory, and a wide variety of other circuit board elements unrelated to encoder 6 and any sensors may also be present and be powered by the present invention.

Figure 2:
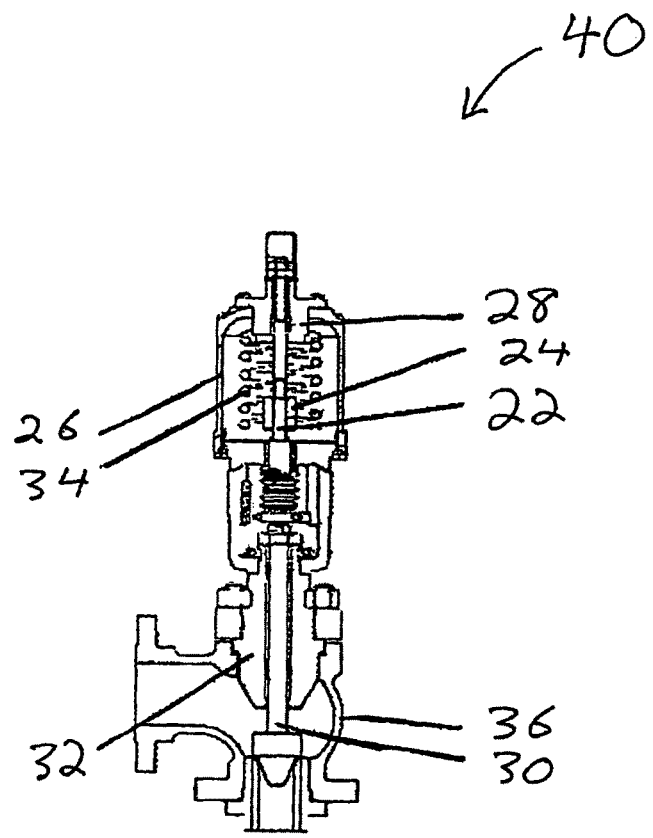
FIG. 2 illustrates a pneumatically driven valve actuator.

The present invention is not limited to any particular valve actuator and may be applied to any valve actuator. FIG. 2 illustrates a pneumatically driven valve actuator, valve actuator 40, as known in the art. Valve actuator 40 is shown mated to valve 36 and actuator stem 22 is coupled to plug 30. The movement of actuator stem 22 results in corresponding movement of plug 30, which governs the operation of valve 36. Valve 36 may be a globe, gate, ball, butterfly, plug, diaphragm, or any other type of valve operable by an actuator. Actuator stem 22 and plug 30 are illustrated for a representative globe valve. However, it should be understood that either component may be modified depending upon the type of valve present. Additionally, when the phrase "drive train" is used hereinafter, the phrase encompasses the drive components of valve actuator 40, such as actuator stem 22.

Valve actuator 40 may also include any number of electronic components, such as, for example, position sensors, circuit boards, and indicators. Any electronic devices, hardware, and/or software known in the art for valve actuators may be included. Any electronic components of valve actuator 40 may be powered by the present invention.

The present invention utilizes operation of a valve actuator to generate electrical power. In a particular embodiment, a portion of the mechanical energy generated by operation of a valve actuator is converted to electrical energy. The mechanical energy may be converted to electrical energy while the valve actuator is operating or the mechanical energy may be stored for later conversion. In an alternative embodiment, operation of the valve actuator triggers the generation of electrical energy via the generator. The valve actuator may be operated manually, electrically, pneumatically, hydraulically, or otherwise. It is preferable that the conversion be accomplished by a generator; however, any source that may be used to generate electricity may be utilized with the present invention, including drives other than directly from actuator's drive train.

"Generator" or "power generation means" as the terms are used herein encompasses rotary, reciprocal, linear, and piezoelectric generators, as well as any other means, for generating power known in the art. The generators may operate based upon electromagnetic induction principles, piezoelectric principles, or any other principle known in the art. The term "generator" encompasses both AC production, such as by an alternator, and DC production. For rotary generators, the main components are a rotor and a stator. Often, the rotor is a magnet such as a permanent magnet or an electromagnet. A rotor with a single magnet is referred to as having two-poles (north and south poles). A rotor with two magnets is referred to as having four-poles. A rotary generator of the present invention may have any number of poles. The stator is often comprised of a coil of copper wires. Any wires or material capable of having current induced therein may be used with the present invention. Rotation of the magnet induces current into the wires of the stator. Alternatively, wires may be rotated around a magnet to induce current into the wires. The term "magnet," as used herein refers to any means of generating a magnetic field known in the art.

In a particular embodiment, the generator includes a component of the valve actuator driven by the drive train. In another embodiment, the generator may be attached externally to a valve actuator, such as near a handwheel, near a valve actuator output, or near a valve stem. In other embodiments, the generator is not attached to the valve actuator. For example, the generator may be attached to the valve. Alternatively, the generator may be separate from the valve actuator and the valve altogether.

The generator may be able to directly receive mechanical energy from a drive train of a valve actuator. The rotary, reciprocating, or linear movement of any component of the drive train may be used to operate the generator. In another embodiment, the generator is able to receive mechanical energy from objects acted upon by the valve actuator. For example, a portion of the mechanical energy imparted to a valve stem could be transferred from the valve stem to the generator. The movement of the valve stem may be utilized to operate the generator. In another embodiment, mechanical energy from the valve actuator is not used to operate the generator. Instead, a separate mechanical energy source may be utilized, such as an engine. In such an embodiment, operation of the valve actuator triggers operation of the generator.

The generator may be adapted to receive mechanical energy from any component of a valve actuator. The generator may be designed to receive mechanical energy from an input means, such as a rotating shaft, a gear, or a linearly moving rod driven by any valve actuator component. Alternatively, a drive train component may be adapted to serve as the input means for the generator. In one embodiment, the input means can be a shaft driven by a gear integrated with the drive sleeve, such as drive sleeve 2 (FIG. 1), of a drive train. In another embodiment, the input means can be a shaft, where a pinion on one end of the shaft mates with a worm gear, such as worm gear 10 (FIG. 1). The other end of the shaft drives the generator. In another embodiment, the generator is driven by a worm shaft, such as worm shaft 3 (FIG. 1). In an alternative embodiment, a gear rack could be integrated with an actuator stem, such as actuator stem 22 (FIG. 2). The rack could, in turn, drive a pinion as the rack moves up and down during actuation of a valve. The rotation of the pinion could, in turn, drive a rotary electrical generator. The input means may have one or more elements, such as, for example, a variety of shafts, gears, chains, belts, pulleys, wheels, couplings, hydraulic pumps and drives. It is contemplated that the input means can be driven by any component of the drive actuator that results in movement of the tube, output shaft, or drive sleeve. Any means for delivering mechanical energy may be used.

In a particular embodiment, the generator is designed to receive the mechanical energy while the valve actuator is operated. In one embodiment, the input means delivers the mechanical energy only when a valve is manually operated, such as by a handwheel or lever. This may be accomplished in a number of ways. For example, the input means may be adapted to move (such as linearly or rotationally) when the valve is manually operated. A non-limiting example of such a means includes incorporating a gear, such as a bevel gear, into a drive sleeve. An input means, such as shaft with an appropriate pinion, can be mated with the gear and with a generator. Rotation of a handwheel connected to the drive sleeve drives the generator.

In another embodiment where a valve actuator includes a clutch, declutching the actuator results in decoupling the motor drive from the drive sleeve and coupling the handwheel into the drive train. This sometimes decouples the worm shaft, but can also decouple the motor. Therefore, the input means of the generator could be designed for intermittent or continuous operation.

Alternatively, the input means can move any time the valve actuator is operated, but the input means is not able to deliver mechanical energy to the generator unless manual operation is used as the source of operation. When a valve actuator is operated, the input means can move, but mechanical energy would not be delivered to the generator. In this example, if the input means is driven off a component that always operates, then the input means would rotate any time the electric motor or the handwheel operates. However, if an engagement means, such as a clutch, disconnects the input means from the generator, then rotation of the input means does not result in a transfer of mechanical energy to the generator. The clutch may be controlled by control means, such as a solenoid, which only allows engagement when the handwheel is the source of operation. The solenoid could be triggered by a loss of power or any other known means. Therefore, only manual operation would result in a transfer of mechanical energy, but electrical operation would automatically declutch the generator.

In another embodiment, any time a valve actuator is operated, a portion of the mechanical energy can be converted to electrical energy. Using the previous example, if the clutch were always engaged, then the generator is activated any time that the valve actuator is operated. Alternatively, where the input means is driven by components that move during operation of the valve actuator (such as, e.g., with movement of an actuator stem), then the clutch may not be necessary. In this scenario, anytime the valve actuator operated, electricity would be produced.

In another embodiment, mechanical energy would be converted when an electric motor is operating, but not when a handwheel is operating. This may be accomplished by driving the input means off of components that only move when the prime mover is operating.

Additionally, mechanical energy from the valve may be stored for later use by the generator. Numerous ways of storing mechanical energy are known in the art, such as, for example, with a spring. The term "spring," as used herein, encompasses single or multiple springs. By way of example, multiple springs could be arranged in series, parallel. With such an embodiment, as the drive train of the valve actuator turns (such as a worm shaft or a worm gear), an input means (such as a shaft) operably connected to the worm shaft or the worm gear could, in turn, be driven and wind up a spring. The spring may, in turn, be used to drive a generator. When the handwheel of the valve actuator is cranked, the stored mechanical energy in the spring is released to drive the generator. In this embodiment, a one time movement of the handwheel could result in power being generated, which power could be utilized for powering status indicators with a valve actuator. When power is restored and the electric motor is operational, the electric motor could rewind up the springs, or series of springs, through the different components of the drive train. The valve actuator will then be prepared for the next power failure.

It may also be advantageous to include a set of electrical contacts built into the valve actuator or, alternatively, built proximate to the valve actuator, where the electrical contacts may be used to sense a power failure. In this fashion, when the power has not failed, but an operator desires to manually operate the valve actuator, the generator would not be released.

A spring represents just one type of a mechanical energy storage device suitable for use with the present invention. Other mechanical energy storage devices that can be used include, for example, a flywheel mechanism, compressed gas or hydraulic accumulators. Where the mechanical energy storage device is operated by the drive train of the valve actuator, a spring can be used.

Although the generator has been described as receiving mechanical energy from the valve actuator, it is also possible for the generator to receive mechanical energy from other sources. For example, the generator may be designed to receive energy from a gas motor. In this embodiment, the generator can act as an external engine-driven generator set which is utilized to power some or all parts of the valve actuator, except for an electric motor. In this embodiment, the external generator could still be triggered by operation of the handwheel. For example, operation of the handwheel could trigger electrical contacts, which would signal generator start-up. Additionally, a set of electrical contacts that sense whether normal power is present can also be included. In this embodiment, in order for the generator to start, the handwheel would have to be operated and normal power would have to be off. When the generator is not relying upon the valve actuator to supply mechanical energy, the generator may still be a part of the valve actuator, either incorporated in the valve actuator or mounted externally on the valve actuator. Additionally, other mechanical energy sources other than an engine may be utilized to power the generator.

Any suitable generator may also be integrated into the components of valve actuator 20, such as, for example, rotary, reciprocating, linear, and piezo-electric generators. The principle components of those generators may be integrated into valve actuator 20. In an embodiment where it is only desirable to generate electricity when the handwheel is operated, the generator can be at least partially integrated into the components actuated by the handwheel. For example, drive sleeve 2 or handwheel adapter 11 can serve as a rotor. Magnets (permanent or electromagnetic) can be built into or attached to either component in such a way as to generate an electromagnetic field with the appropriate orientation. Coils of wire can be integrated into the housing of valve actuator 20 that surrounds drive sleeve 2 or handwheel adapter 11. Alternatively, conductive wires can be integrated into a rotary component, such as handwheel adapter 11 or drive sleeve 2, and magnets can be integrated into a stationary component of valve actuator 20. It is understood that any suitable way of incorporating a generator into the components operated by handwheel 1 can be employed.

In another embodiment, a generator may be integrated into components operated by a prime mover, such as electric motor 4. For example, a rotary generator may be integrated into worm shaft 3 in a similar manner as discussed above with regard to handwheel adapter 11. A generator may also be integrated into worm gear 10. In an alternative embodiment, a generator may be integrated into actuated components regardless of whether electric motor 4 or handwheel 11 is the power source. For example, a generator may be integrated into valve stem nut.

Similarly, the generator may also be at least partially integrated into the components of valve actuator 40. Magnets can be integrated into or attached to actuator stem 22. A stator could then circumscribe actuator stem 22. Alternatively, the stator can be built into actuator stem spacer 24, actuator housing 26, or hub housing 28.

The generator may also be partially or completely integrated with components of a valve. In the embodiment of globe valve illustrated in FIG. 2, magnets may be integrated with or attached to plug 30. A stator can be integrated into bonnet 32. Similarly, the generator may be integrated partially or completely with a valve operated by valve actuator 20. For example, a valve stem can be adapted to server as a rotor.

In all of the embodiments discussed herein, the generator may be used for normal or intermittent operation. "Normal," as the term is used herein, refers to the usual operation of a valve actuator. For an electrically driven valve actuator, normal operation utilizes an electric motor, such as electric motor 4 (FIG. 1), to operate a valve actuator. Intermittent operation refers to operation via a handwheel, lever, or other manual operation device, such as handwheel 1.

Intermittent or normal operation may be governed by which component of a valve actuator is driving the generator. If the component driving the generator operates normally then the generator will operate normally. Alternatively, the generator may be driven by a component which operates normally (e.g., worm shaft 3 of valve actuator 20), but the generator may be intermittently operated. In this embodiment, the input means for the generator, which may be the drive train components or a shaft, rod, or gear driven by the drive train component, is separated from the generator by a disengagement means. The disengagement means may be a clutch or any other device for mechanically separating two components. Therefore, the input means may be operated normally, but the generator will only be intermittently operated. The engagement means may be governed by a control means.

For example, it may be desirable to have a control means which only allows operation of the generator when the power supply for an electric motor, such as electric motor 4 (FIG. 1), is disrupted. The control means may be a solenoid, a piezoelectric material, an electrostrictive material, a magnetostrictive material, or any device, or combination of devices, that has different physical states depending upon the presence of electricity. For example, the position of a solenoid may depend upon whether current is present. Electrostrictive and magnetostrictive materials experience elastic strain when exposed to electric or magnetic fields, respectively.

Intermittent power generation may be useful in situations where the valve actuator relies on electrical power for status indicators and other electronics since the main mode of power for the valve actuator is coming from compressed air. Similar to the pneumatic valve actuator, the present invention may also be used with hydraulically actuated valve actuators, or may be used with hybrid actuators such as, for example, gas over oil actuators, electrohydraulic fail-safe actuators, high pressure gas powered actuators and various combinations of electric, hydraulic, and/or pneumatic actuators. The present invention may also be utilized with quarter-turn or multiturn valve actuators.

Additionally, it may be desirable to operate a generator at the same speed as the valve actuator, at a proportional speed relative to the valve actuator, or at a constant speed regardless of the speed of the valve actuator. A speed modulation means may therefore be added. The speed modulation means may receive mechanical energy from the input means and deliver the mechanical energy to the engagement means. Alternatively, the speed modulation means may be disposed between the engagement means and a generator. The speed modulation means can include any suitable mechanical device, such as gears, shafts, belts, friction devices, viscous sheer coupling, or wheels, for increasing, decreasing, or stabilizing the speed at which a generator is operated.

The speed modulation means may also include a transmission for operating a generator within a range of speeds. The speed modulation means may vary depending upon the needs of the valve actuator. For example, a large valve actuator that is difficult to operate manually can turn at a slower speed than a smaller actuator that is easy to operate by hand. With regard to the larger valve actuator, it may be necessary to include more gears capable of increasing the input speed to a rotary generator. A smaller valve actuator may be capable of quicker rotation and, thus, need less speed increase.

In addition to the speed modulation means, power modulation means having the necessary electronics to compensate for variations in speeds may be provided. A variety of diodes, regulators, transformers, and other electrical components that are known in the art may be utilized to maintain a constant voltage.

In a particular embodiment, the present invention can be used with an electrically driven valve actuator. In another embodiment, when normal power is not supplied to the electrically driven valve actuator and the handwheel is operated, enough electrical energy is generated to power at least the local status indicators, such as the position indicators. Preferably, sufficient power is generated to power all of the remote and local indicators. Even more preferably, sufficient power is generated to power all of the accessory electronics of the valve actuator (i.e., everything but the electric motor). The accessory electronics can include an absolute position encoder or an incremental position encoder.

The present invention may be used without a battery, to backup a battery, or both may be used in tandem. Alternatively, the battery may be used to backup the present invention. A rechargeable battery can also be used as a backup battery. The rechargeable battery can be charged by the generator of the present invention. In another embodiment, a super capacitor can be charged while operating under normal power, which in turn, could power the electronics for weeks or months upon loss of normal power. The super cap could smoothly transition to act as the power source during any loss of normal power.

The present invention also includes an electrical power storage means, not to be confused with the previously discussed mechanical energy storage device. In addition to the batteries and rechargeable batteries, the electrical energy storage means may also include, for example, capacitors, inductors, and/or bladders. The electrical power storage means may serve various functions, including to clean the energy being produced by the generator. The electrical energy generated by the manual operation of the handwheel, by the operation of springs, or by some other source, may be of variable consistency. Variations in the speed at which a generator is turned can cause numerous problems. For example, for an AC generator, the speed of the generator determines the voltage and frequency of the power output. Components of the valve actuator that run on AC may only be designed to handle fifty or sixty Hertz of electrical input. Additionally, variations in voltage may be unacceptable for certain electronic devices. For DC generators, variations in speed may result in variations in power output. Many electrical power storage means are designed for DC output. In the embodiment where the means is a battery, the battery can receive electrical input of varying quality but can, in turn, output a more consistent quality of electricity. Additionally, power modulation means (such as, for example, transformers, rectifiers, converters or inverters) may be utilized to control the type and quality of the electricity transmitted to valve actuator electronics.

The present invention encompasses operating the generator any time the electric motor operates the valve actuator. For example, where the valve actuator is designed so that the status indicators and other accessory electronics are positioned on a separate circuit relative to the electric motor, both circuits must be powered in the event of a power failure. Alternatively, the present invention may be utilized to generated electricity when the electric motor is operated, thus eliminating the need to power both circuits.

Another embodiment where the present invention may be utilized includes a valve actuator that has a handwheel and does not have any other type of prime mover. This can provide power for electrical or digital position readout or other status information for systems found in remote locations. The power generated by the generator may be utilized to power numerous electronics and devices. In a valve actuator having only a handwheel, the valve actuator may also be coupled to the transmitter, which can transmit either through land lines, wireless communications, or satellite communications the updated position of the valve as it is actuated. The present invention provides a way to provide power to previously isolated valve actuators.

Similar to the valve actuator with only a handwheel, another embodiment includes power takeoff or PTO driven valve actuators. The generator of the present invention may be coupled to a PTO driven valve actuator to generate electricity for use with indicators or any electrical component. The present invention may be designed as a device that is sold with new valve actuators or it may be designed to retrofit old valve actuators.

The power source of the present invention may be designed for providing electrical power during operation of the valve actuator, immediately after operation, or both. Additionally, the generator and associated input means may be designed to provide enough power to power any accessory electronics for an extended period of time. The extended period of time is limited only by the type of generator and energy storage device that is employed.

Figure 3:
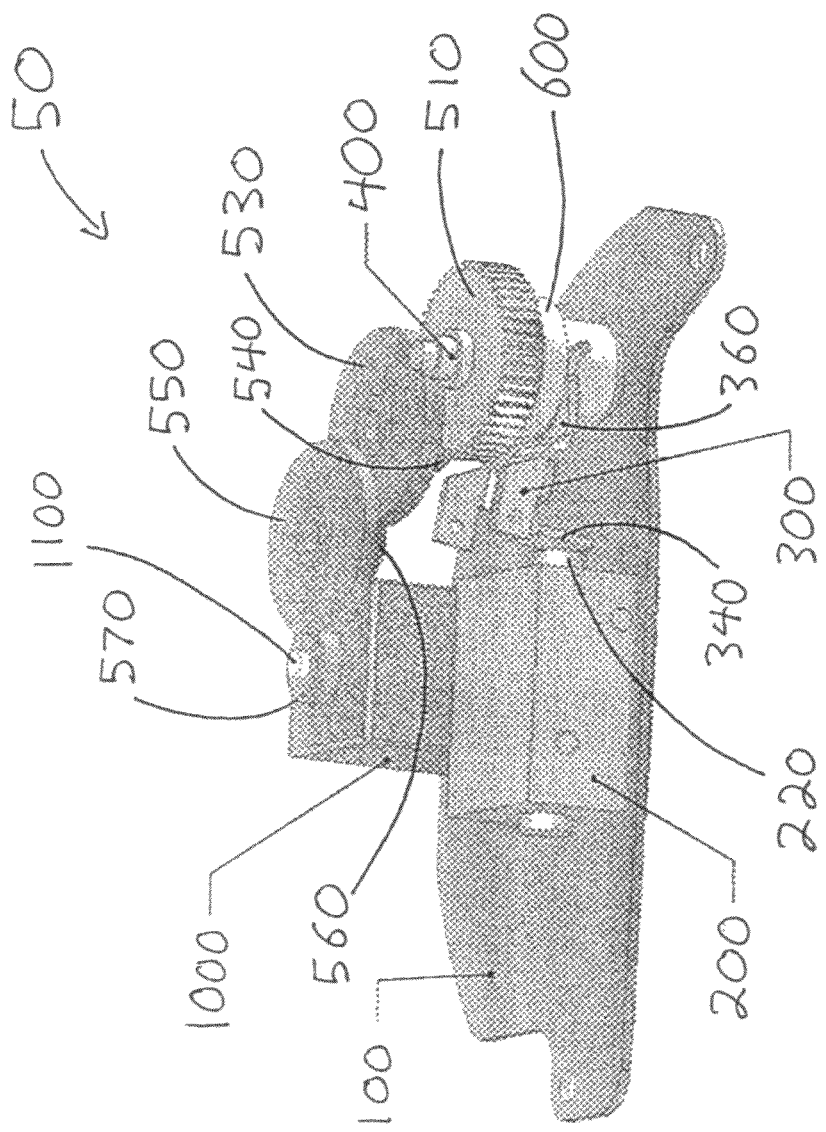
FIG. 3 illustrates one embodiment of a power source according to the present invention.
Figure 4:
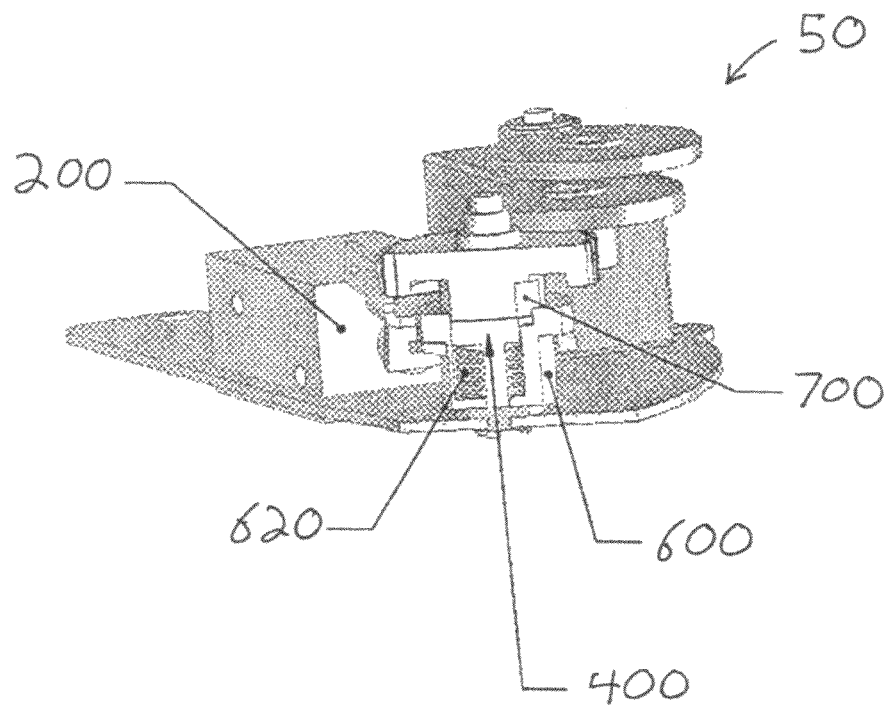
FIG. 4 is a cut-away view of the embodiment depicted in FIG. 3 showing an energized solenoid and a disengaged clutch.
Figure 5:
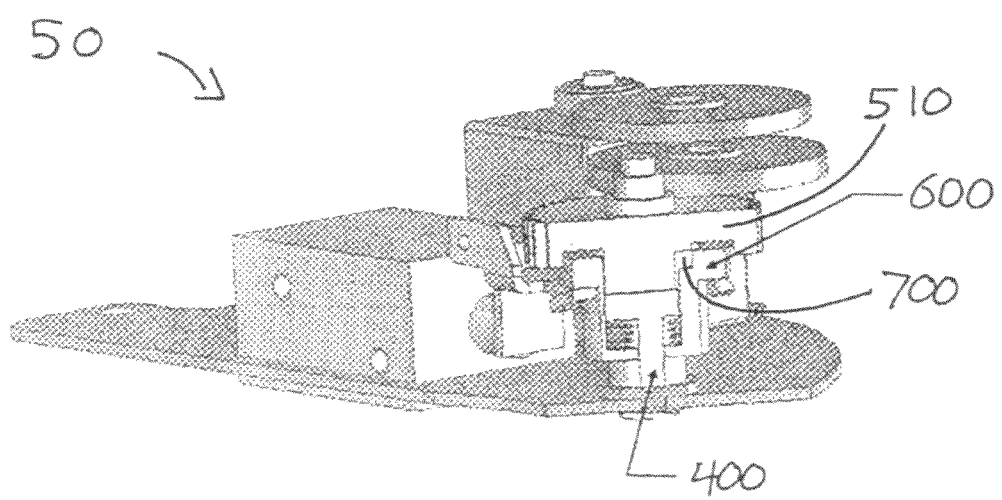
FIG. 5 is a cut-away view of the embodiment depicted in FIG. 3 showing a de-energized solenoid and an engaged clutch.

FIGS. 3-5 illustrate one embodiment of a power source 50 of the present invention. In this embodiment, the power generation means is a rotary generator. Generator 1000 is turned via gears 500 by an input shaft 400. Input shaft 400 may be designed for normal operation, such as where input shaft 400 is connected to the drive train of a valve actuator. In a particular embodiment, input shaft 400 is connected to the handwheel such as handwheel 1 (FIG. 1), of a valve actuator. Gears 510, 530, 550 and 570 are utilized to increase the speed of input shaft 400 so that input shaft 1100 of generator 1000 rotates at a much higher speed. Gear 510 is shown with the teeth on the gear. Although not shown, teeth may also be present on gears 530 and 550 and pinions 540, 560, and 570. Gears 530 and 550 and pinions 540, 560, and 570 are illustrated as spur gears. However, any type of gear may be utilized, such as worm, bevel, helical or any other type of gear. Attached to the underside of gears 530 and 550 are pinions 540 and 560, respectively. Gear 510 mates with pinion 540, which drives gear 530; gear 530 mates with pinion 560, which drives gear 550. Gear 550, in turn, mates with pinion 570. In this manner, input shaft 1100 receives an increased speed input. Gears 510, 530, and 550 and pinions 540, 560, and 570 (collectively "gears and pinions") represent one embodiment of a speed modulation means. The ratio of teeth between the gears and pinions can be adjusted as necessary to provide the proper input speed to input shaft 1100. Additionally, fewer or more gears and pinions may be utilized. The gears and pinions may be located between clutch 600 and generator 1000, as depicted. Alternatively, the gears and pinions may be located between the drive train and the input means. It is also understood that increasing generator speed is not always necessary and, in fact, there may exist situations where reduced speed input may be desired.

In the present embodiment, generator 1000 is mounted to mounting plate 100. Generator 1000 is shown with housing 1200. However, it is understood that housing 1200 may or may not be present. Solenoid 200 is also mounted to mounting plate 100. Solenoids are well known in the art. In a particular embodiment, solenoid 200 is an electrical solenoid. However, solenoid 200 may include any suitable solenoid, such as a pneumatic or hydraulic solenoid. Solenoid 200 includes plunger 220 and a solenoid spring (not shown). Solenoid operation is well known in the art. Plunger 220 has an iron core which is attracted to an electric coil (not shown) inside of the solenoid. When current is traveling through the coil, the iron core of plunger 220 is attracted and moves towards the center of the coil. The solenoid spring is attached to plunger 220 in opposition to the coil and the spring is extended whenever current is flowing through the coil. When current is not flowing through the coil the solenoid spring retracts the plunger away from the center of the coil. Alternatively, the solenoid spring may be compressed whenever the coil is energized. Of course, numerous variations in solenoid 200 are possible. Solenoid 200 is just one embodiment of a control means for the engagement means. Any suitable control means known for engaging clutch 600 may be used. It is also understood that other embodiments are envisioned where solenoids are not included.

Lever 300 is attached to mounting plate 100. Lever 300 includes handle 340 and lever arms 360. Plunger 220 of solenoid 200 engages handle 340 of lever 300. When the coil of solenoid 200 is energized, plunger 220 is retracted, causing lever 300 to pivot so that lever arms 360 are in a down position. When the coil is de-energized then plunger 220 extends, pushing against handle 340 and pivoting lever 300 such that lever arms 360 move into an up position. Lever arms 360 engage clutch 600. When plunger 220 is extended, clutch 600 is raised and results in input shaft 400 engaging gear 510. Lever 300 is part of one embodiment of an engagement means.

FIG. 4 illustrates the operation of clutch 600 when the coil of solenoid 200 is energized. FIG. 5 illustrates operation of clutch 600 when the coil is de-energized. Referring to FIG. 4, clutch 600 includes clutch spring 620. Clutch spring 620 opposes the movement of arms 360 of lever 300. Clutch spring 620 is shown as being inside clutch 600. However, clutch spring 620 may also be around, above, or beneath clutch 600. Clutch spring 620 is shown as being compressed whenever lever arms 360 are raised into the up position. Alternatively, clutch spring 620 may be elongated whenever lever arms 360 are raised to the up position.

In another embodiment, clutch spring 620 may not be present. Clutch spring 620 serves to pull clutch 600 into a down position whenever lever arms 360 are moved to the down position. In FIGS. 3-5, lever arms 360 push against a flange of clutch 600. However, if lever arms 360 are permanently secured to clutch 600, and lever handle 340 are secured or attached to plunger 220, then as plunger 220 is retracted by energizing the coil clutch 600 will in turn be pulled into the down position. Therefore, there is no need for clutch spring 620. Lever arms 360 may be secured temporarily or permanently to clutch 60 in any fashion.

Clutch 600 and, optionally flat surface 700, comprise a particular embodiment of an engagement means. Alternatively, clutch 600 may be a transmission, such as an infinite velocity drive where, regardless of the speed of input shaft 400, generator 1000 is turned at the same speed.

The functions of solenoid 200, lever 300, and clutch 600 may be performed by a single device. For example, clutch spring 620 can also serve the function of a solenoid spring. Clutch 600 can be adapted so that the coil, when energized, attracts clutch 600 towards the center of the coil. When the coil is de-energized, the clutch spring 620 can pull clutch 600 into engagement with gear 510. In that embodiment, there is no need for lever 300. The embodiment of power source 50 shown in FIGS. 3-5 has a flatter profile. In an embodiment where the solenoid 200 and clutch 600 are integrated into a single device, it is likely that the profile would be more raised. However, the overall footprint of that embodiment can be smaller. Therefore, the embodiment where solenoid 200 and clutch 600 are a single device may be useful where it is necessary to have a narrower power source.

Input shaft 400 is just one embodiment of an input means. Input shaft 400 may be coupled to a valve actuator in any manner discussed above and below, or in numerous other ways apparent to one of ordinary skill in the art.

Power source 50 may have any number of layouts. Power source 50 may be designed to fit a wide variety of space constraints for a variety of valve actuators. In tandem with or in alternative to space constraint of the valve actuator, power source 50 may also be designed around the physical constraints of the selected generator 1000. Generator 1000 may be selected to meet a wide variety of criteria, such as, for example, the power supply needs of the valve actuator auxiliary electronics, such as voltage or power type, as in AC or DC. The current and frequency requirements may also be analyzed in selecting an appropriate generator 1000. Additionally, generator 1000 may be selected simply because it is an off-the-shelf generator. In either scenario, power source 50 may be designed around the physical size and mechanical input needs of generator 1000.

In a particular embodiment, generator 1000 is a rotary generator. Generator 1000 may be a DC or an AC generator. Power can also be generated by generator 1000 as gear 510 is turned. In another embodiment, however, the mechanical energy transfer from input shaft 400 to gear 510, and eventually to input shaft 1100, may be stored. For example, housing 1200 may include a spring that is windable by input shaft 1100. When the spring is fully wound, the spring could slip or ratchet, thus preventing over-winding of the spring. Alternatively, a circuit connected to the coil of solenoid 200 could be utilized to control when the spring is wound up and disengage clutch 600 to prevent overwinding. Electrical contacts can also be provided within generator housing 1200 to signal either a controller or solenoid 200 to disengage clutch 600 when the springs have been fully wound. The springs can then be released upon operation of a handwheel. Various mechanisms for releasing the springs may be utilized. Rotation of input shaft 1100 in an opposite direction can trigger the release of the springs. However, it is generally desirable that input shaft 1100 be rotatable in either direction. Alternatively, magnetic switches holding the spring in place can be released by signals controlled through movement of a handwheel.

In the embodiments discussed so far, clutch 600 can be disengaged whenever the coil of solenoid 200 is energized. However, solenoid 200, and any other components of power source 50, may be designed such that when the coil is de-energized, clutch 600 is engaged.

FIG. 4 illustrates that clutch 600 engages gear 510 via a flat surface 700. Flat surface 700 may be part of one embodiment of an engagement means. However, clutch 600 may be designed to engage gear 510 in numerous ways. FIGS. 4 and 5 illustrate one embodiment where clutch 600 is mechanically connected with gear 510. Other mechanical means, such as the pressing of an elastomer pad between clutch 600 and gear 510, may be utilized. Alternatively, clutch 600 and flat surface 700 may be designed so they do not contact one another. For example, clutch 600 may be designed to hydraulically or magnetically engage flat surface 700 or gear 510. Clutch 600 may be designed so that it turns whenever input shaft 400 is turning.

In one embodiment, input shaft 1100 and input shaft 400 are both designed to rotate in two directions. Alternatively, input shaft 400 may be designed to rotate in two directions, but gearing may be present so that input shaft 1100 only turns in one direction. This may be accomplished so that movement of input shaft 400 in either direction may be transferred to input shaft 1100 or, alternatively, so that only the movement of input shaft 400 in one direction results in movement of input shaft 1100.

In another embodiment, input shaft 400 is connected to a handwheel of a valve actuator, such as handwheel 1, or to components operated by the handwheel. In that embodiment, input shaft 400 would only turn whenever the handwheel is operated. In certain situations, a handwheel may still be rotated manually even though power is still available to turn an electric motor. In those situations, it may not be desirable to activate generator 1000 of power source 50. Therefore, the coil can be de-energized in order for the turning of input shaft 400 to also turn gear 510. The coil may be energized in numerous ways, as is known in the art. In one embodiment, the coil receives power from the same circuit that powers an electric motor, such as electric motor 4, of a valve actuator. Therefore, if power ceases to be supplied to the controls of the electric motor, then solenoid 200 de-energizes. Clutch 600 then engages gear 510 and, should the handwheel be rotated, then generator 1000 will be activated.

Additionally, a switch may be included whereby an operator may allow operation of generator 1000 even though power is still available to an electric motor. For example, a switch may be included that opens the circuit energizing the coil. Clutch 600 engages gear 510 and any rotation of input shaft 400 results in rotation of generator 1000.

In another embodiment, input shaft 400 is rotated whenever the valve actuator is operated. However, the operation of generator 1000 may still be controlled by whether the coil was energized or not. Therefore, generator 1000 will only be rotated whenever the valve actuator is operated without electrical input, such as manually, hydraulically, or pneumatically.

An energy storage device (not shown) may also be mounted on mounting plate 100 and connected to generator 1000. The energy storage device may be any electrical power storage means previously discussed or known in the art.

Electronics 900 may also be mounted on mounting plate 100. Electronics 900 may be utilized to convert, invert, rectify, transform, clean, and/or control the electrical power delivered by generator 1000. Electronics 900 may be electrically connected between generator 1000 and the energy storage device. Alternatively, electronics 900 may receive power from the energy storage device. For example, if generator 1000 is an AC generator, then a converter may be utilized to convert the AC power to DC power for storage. Electronics 900 is one embodiment of an electrical power modulation means. The electrical power modulation means and electrical power storage means may be accomplished by the same device.

Numerous variations of each and all of the components of power source 50 are within the scope of the invention. Power source 50 is shown as being mounted on mounting plate 100. Generator 1000, solenoid 200 and the other components of power source 50 may be mounted to mounting plate 100 in any suitable way known in the art. Mounting plate 100 may be made out of a wide variety of materials, such as, for example, a metal or a semiconductor wafer. Mounting plate 100 is shown having a flat surface. However, mounting plate 10 may be any structure that connects the different components of power source 50. The term "components" as used in reference to power source 50 refers to solenoid 200, lever 300, clutch 600, the gears and pinions, and generator 1000. The term "components" also refers to any devices performing the functions of those individual parts.

Additionally, in particular embodiments, mounting plate 100 may not be included. For example, generator 1000 can be mounted to one portion of a valve actuator, and solenoid 200 and clutch 600 could be mounted to other parts of the valve actuator. Alternatively, generator 1000, clutch 600 and the functions performed by solenoid 200 could all be integrated into a single device.

The components of power source 50 may be made from numerous materials. Lever 300 and clutch 600, for example, may be made from materials such as metals, plastics, or resins. Mounting plate 100 may also be made from circuit board materials or any other material compatible with such functions.

Input shaft 400 is shown in FIGS. 3-5 as being connected to input shaft 1100 via mechanical means. In the embodiment shown in FIGS. 3-5, the speed modulation means comprises mechanical means consisting of gears. However, other mechanisms, such as pulleys or wheels, may also be used to connect the two shafts. Alternatively, input shaft 400 may be connected to input shaft 1100 hydraulically, such as via hydraulic pumps and lines. Additionally, input shaft 400 may be fluidically coupled to input shaft 1100. Additionally, if it is not necessary to increase the speed of input shaft 400, then input shaft 400 and input shaft 1100 can be directly coupled to one another, such as in an embodiment where the functions performed by solenoid 200 and by clutch 600 are all integrated into a single device with generator 1000.

Although the foregoing description contains many specifics, these are not to be construed as limiting the scope of the present invention, but merely as providing certain exemplary embodiments. Similarly, other embodiments of the invention can be devised which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A valve actuator system, the system comprising:
   a valve actuator comprising accessory electronics and a drive train comprising an electrical motor for electrical operation of the drive train and a manual operation mechanism for manually operation of the drive train by a user, the valve actuator coupled to a valve and adapted to regulate flow within the valve;
   a clutch adapted for transferring control of the drive train between the electrical motor and the manual operation mechanism; and
   an electrical generator adapted to electrically power the accessory electronics of the valve actuator, the electrical generator adapted to receive energy from manual operation of the drive train of the valve actuator to regulate flow within the valve by the manual operation mechanism.

2. The system according to claim 1, wherein the generator is adapted for AC or DC output.

3. The system according to claim 1, wherein the generator is external to the valve actuator.

4. The system according to claim 1, wherein the accessory electronics are selected from a group consisting of at least one indicator, at least one circuit board, at least one control module, at least one position encoder, at least one communication line, at least one transmitter, and at least one receiver.

5. A method of electrically powering a position encoder of a valve actuator, the method comprising:
   operating a drive train of the valve actuator to regulate flow within a valve;
   generating mechanical energy from the operation of the drive train of the valve actuator;
   converting a portion of the mechanical energy into electrical energy; and
   electrically powering the position encoder of the valve actuator configured to monitor a position of the valve actuator with the electrical energy.

6. The method according to claim 5, wherein operating the drive train of the valve actuator to generate mechanical energy comprises manually operating the valve actuator with a manual operation mechanism.

7. The method according to claim 6, further comprising transferring operation of the valve actuator from an electric motor to the manual operation mechanism.

8. The method according to claim 5, further comprising storing the mechanical energy generated prior to converting a portion of the mechanical energy.

9. The method according to claim 8, further comprising triggering release of the stored mechanical energy by manually operating the drive train of the valve actuator to regulate flow within the valve with a manual operation mechanism.

10. The method according to claim 5, further comprising storing the electrical energy in an energy storage device.

11. The method according to claim 5, wherein electrically powering the position encoder of the valve actuator comprises providing power to the position encoder during operation of the drive train of the valve actuator.

12. A method of electrically powering a position encoder of a valve actuator, the method comprising:
   operating a drive train of the valve actuator to regulate flow within a valve;
   generating mechanical energy from the operation of the drive train of the valve actuator;
   storing the mechanical energy generated;
   converting a portion of the stored mechanical energy into electrical energy;
   triggering release of the stored mechanical energy by manually operating the drive train of the valve actuator with a handwheel to regulate flow within the valve; and
   electrically powering the position encoder of the valve actuator with the electrical energy.

13. The method according to claim 12, wherein storing the mechanical energy generated comprises winding a spring.

* * * * *